United States Patent
Thomas et al.

(10) Patent No.: US 7,139,328 B2
(45) Date of Patent: Nov. 21, 2006

(54) METHOD AND APPARATUS FOR CLOSED LOOP DATA TRANSMISSION

(75) Inventors: Timothy A. Thomas, Palatine, IL (US); Xiangyang Zhuang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/209,309

(22) Filed: Aug. 23, 2005

(65) Prior Publication Data

US 2006/0093065 A1 May 4, 2006

Related U.S. Application Data

(60) Provisional application No. 60/624,819, filed on Nov. 4, 2004.

(51) Int. Cl.
*H04L 27/04* (2006.01)
(52) U.S. Cl. ............... 375/299; 375/267; 375/295; 455/101
(58) Field of Classification Search ........ 375/267, 375/299, 347, 130, 147, 146, 358, 295; 455/101, 455/103, 522, 69
See application file for complete search history.

(56) References Cited

U.S. PATENT DOCUMENTS

| | | | |
|---|---|---|---|
| 6,888,809 B1 * | 5/2005 | Foschini et al. | 370/334 |
| 2002/0128026 A1 * | 9/2002 | Derryberry et al. | 455/504 |
| 2002/0196842 A1 * | 12/2002 | Onggosanusi et al. | 375/148 |
| 2003/0185309 A1 * | 10/2003 | Pautler et al. | 375/257 |
| 2004/0121810 A1 * | 6/2004 | Goransson et al. | 455/562.1 |
| 2004/0224725 A1 * | 11/2004 | Kim et al. | 455/561 |
| 2005/0053170 A1 * | 3/2005 | Cartreux et al. | 375/267 |
| 2005/0181736 A1 * | 8/2005 | Cao et al. | 455/69 |

* cited by examiner

*Primary Examiner*—Temesghen Ghebretinsae

(57) ABSTRACT

A method for communicating a plurality of data streams between a transmitting device with multiple transmit antennas and a receiving device, is disclosed. The method comprises determining a set of power weightings, efficiently quantizing the power weightings, and providing the set of power weightings the transmitting device. Another aspect of the invention comprises the transmitter implicitly signaling the number of data streams which the receiver should feedback information for through the amount of feedback requested. An additional aspect of the invention is a means of determining the best codebook weights by combining the maximum power and maximum capacity criteria.

11 Claims, 12 Drawing Sheets

100

200

300

400

500

600

700

800

900

1000

1100

1200

METHOD AND APPARATUS FOR CLOSED LOOP DATA TRANSMISSION

FIELD OF THE INVENTION

The present invention relates generally to communication systems, and in particular, to a method and apparatus for providing power weightings in Multiple Input Multiple Output (MIMO) transmission.

BACKGROUND OF THE INVENTION

Multiple Input Multiple Output (MIMO) is a transmission method involving multiple transmit antennas and multiple receive antennas which promises to greatly increase the link capacity of wireless communication systems. Various transmission strategies require the transmit array to have some level of knowledge concerning the channel response between each transmit antenna element and each receive antenna element, and are often referred to as "closed-loop" MIMO. Obtaining full broadband channel knowledge at the transmitter is possible using techniques such as uplink sounding in Time Division Duplexing (TDD) systems and channel feedback in either TDD or Frequency Division Duplexing (FDD) systems. Limited feedback methods like feeding back an antenna selection indicator or codebook-based beamforming weights selection can reduce the amount of feedback as opposed to full channel feedback. These limited feedback methods can be improved on if a power weighting is fed back along with the codebook weights. However, conveying the power weighting to the transmitter can require significant channel resources. Thus an efficient feedback method is needed to provide the power weighting to the transmitter.

SUMMARY OF THE INVENTION

Figure 1:
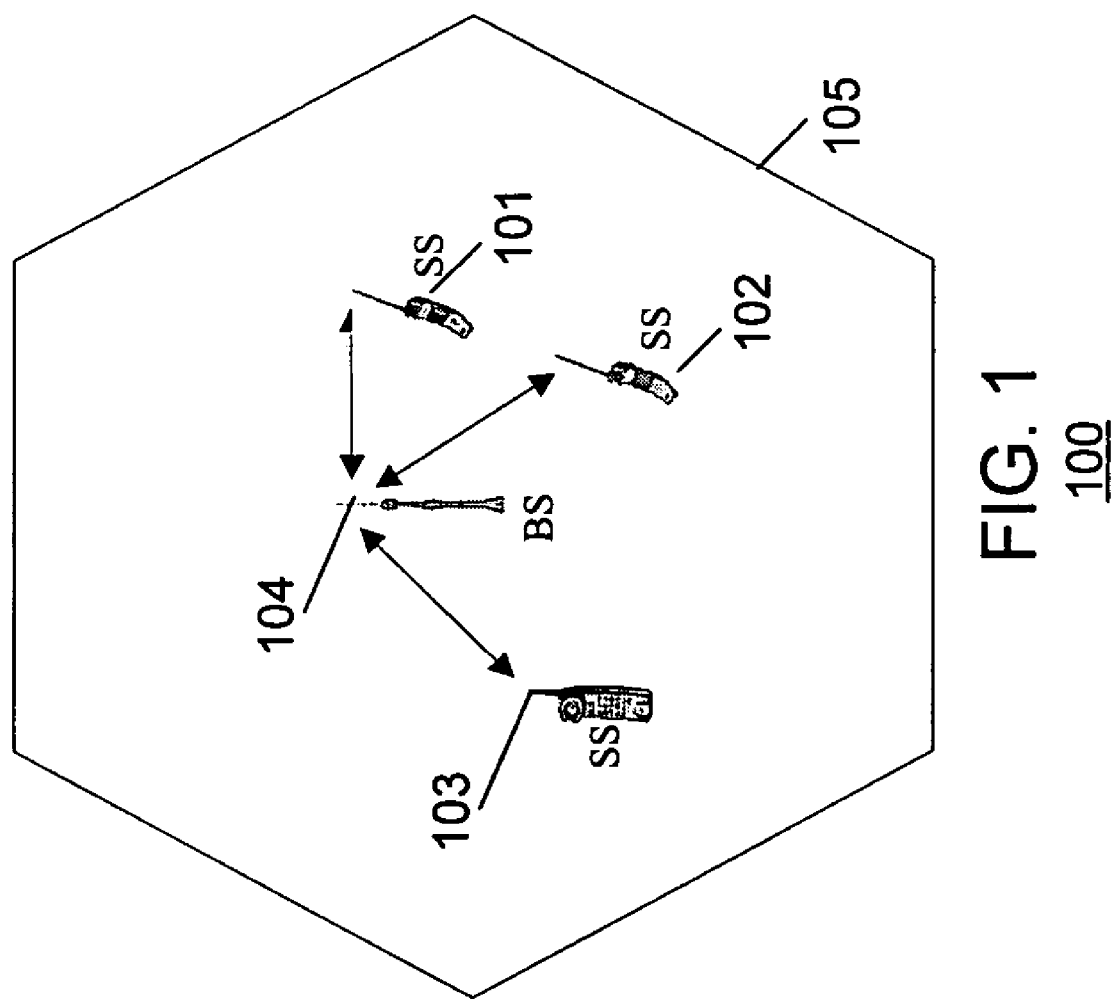
FIG. 1 is a block diagram of a communication system.

Closed-loop Multiple-Input Multiple-Output (MIMO) methods promise to greatly improve the performance of MIMO communications if full channel knowledge is known at the transmitter. Obtaining full broadband channel knowledge at the transmitter is possible using techniques such as uplink sounding in Time Division Duplexing (TDD) systems and channel feedback in TDD or Frequency Division Duplexing (FDD) systems. Limited feedback methods like feeding back message for antenna selection or codebook-based beamforming weights selection can reduce the amount of feedback as opposed to full channel feedback. However these limited feedback methods can be improved for realizable receivers (e.g., linear MMSE, successive interference cancellation, or maximum likelihood) by providing a power weighting for each beamformed signal stream along with the codebook weight or antenna selection for each stream.

The invention is a method and device for efficiently providing power weightings for each data stream in MIMO transmission. The feedback is designed to improve the performance of the receiver when codebook selection over a certain bandwidth or set of subcarriers is used. A codebook weight vector (e.g., antenna selection weights/vector or Grassmannian weights for example) is determined over a group of frequency-domain subcarriers for each MIMO data stream along with a power weighting for each stream. Note that antenna selection can be described by using a codebook containing transmit weight vectors that correspond to the columns of the identity matrix. Then a codebook weight and power weighting are fed back for each stream for the group of subcarriers. The invention provides an efficient way to quantize the power weightings and feed them back to the transmitter along with the codebook weights.

Another aspect of the invention involves an efficient mechanism for the transmitter to convey how many data streams that the receiver needs to feedback information for. The upper bound of the number of data streams that can be supported in an MIMO system is the smaller number between the number of receiver antennas and the number of transmit antennas. But the actual number of streams is also dependent on the channel condition (e.g., spatial condition and the receive SNR). The decision is best made at the receiver, but the total feedback resource needed to convey the codebook weights and power weighting for all the streams must be allocated first. Although a maximum feedback resource can always be allocated, it can be wasteful. An alternative is for the receiver to feedback the number of data streams first as a request for feedback resource, but it can involve extra latency. The efficient mechanism in the invention is to implicitly convey in the feedback request and feedback resource allocation message the number of data streams for which the feedback is requested.

For simplicity, the invention is presented from the point of view of providing a base station (BS) with the information necessary for setting the transmit weights in a closed-loop antenna array system (e.g., a plurality of spatially separated transmit antennas) when transmitting to a subscriber station (SS). It should be clear that the invention also applies to scenarios where the roles of a BS and SS are reversed from the roles described herein. For example, the invention can be applied to the scenario where the SS is to be provided with the necessary information to enable closed-loop transmission from an SS to a BS. Therefore, although the description will focus mainly on the case of the BS transmitting to a SS, the term "source communication unit" will refer to a communication unit (e.g., a BS, SS or other transceiver) that can perform closed loop transmission to a "target communication unit".

Also, some terms are used interchangeably in the specification: The terms, channel response, frequency selective channel profile, space-frequency channel response, are all referring to the channel response information needed by the base station in order to utilize closed-loop transmission techniques. The terms waveform and signal are also used interchangeably. A Subscriber device or Subscriber Station (SS) is sometimes referred to as a Mobile Station (MS) or simply a mobile, and the invention applies equally to cases where the subscriber device is fixed or mobile (i.e., not fixed). A receiving device can be either a Base Station (BS), Subscriber Station (SS) or any combination thereof. Also, a transmitting device can be either a BS, SS, MS, or any combination thereof. Additionally, if the system has repeaters, relays or other similar devices, the receiving device or the transmitting device can be a repeater, relay, or other similar device. The repeater or relay can be considered equivalent to an SS if the BS is performing closed-loop transmission to the repeater/relay. The repeater or relay can be considered equivalent to a BS if the relay is performing closed-loop transmission to the SS. The term fast Fourier transform (FFT) and inverse fast Fourier transform (IFFT) refer to discrete Fourier transform (or similar transform) and inverse discrete Fourier transform (or similar transform) respectively.

DETAILED DESCRIPTION OF THE INVENTION

Turning now to the drawings, wherein like numerals designate like components, FIG. 1 is a block diagram of communication system 100 in which the present invention can operate. Communication system 100 comprises one or more cells 105 (only one shown) each having a base station (BS, or base station) 104 in communication with a plurality of subscriber stations (SSs) 101–103. If a transmission is to be performed on the downlink to SS 101, the BS 104 can be referred to as a source communication unit, and the SS 101 can be referred to as a target communication unit. If a transmission is to be performed on the uplink from SS 101 to the BS 104, SS 101 can be referred to as a source communication unit, and the BS 104 can be referred to as a target communication unit. In the preferred embodiment of the present invention, communication system 100 utilizes an Orthogonal Frequency Division Multiplexed (OFDM) or multicarrier based architecture including Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other cellular communication system protocols such as, but not limited to, TDMA, direct sequence CDMA, cyclic prefix single carrier systems, interleaved frequency division multiple access systems.

Figure 2:
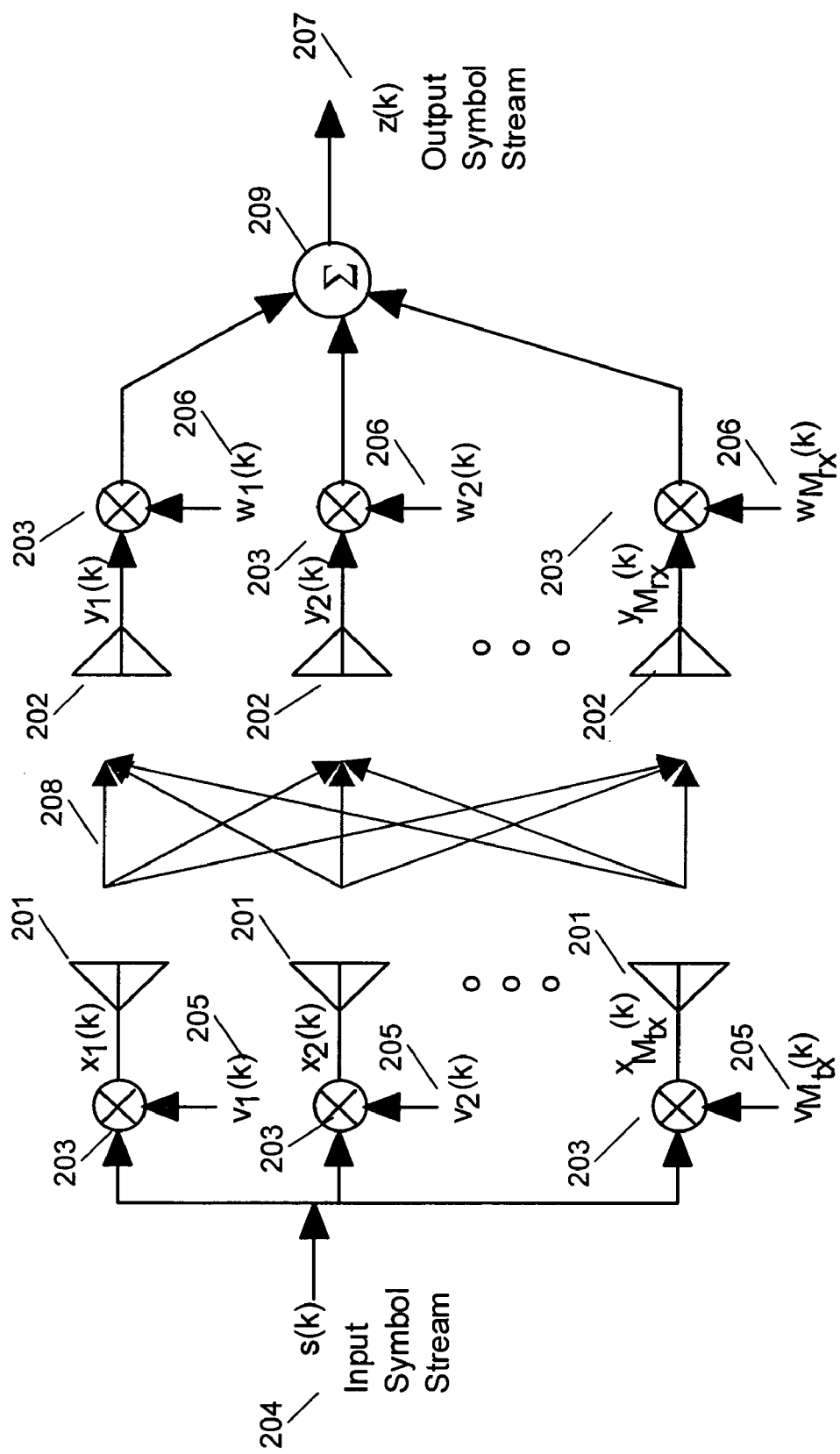
FIG. 2 is a block diagram of a closed-loop transmit antenna array communicating a single data stream to a receiving device having one or more receive antennas.

FIG. 2 is a block diagram of a closed-loop transmit antenna array as part of a source unit communicating a single data stream to a receiving device as part of a target communication unit having one or more receive antennas. Input stream 204 is multiplied by transmit weights 205 using multipliers 203 before being fed to the multiple transmit antennas 201. The signals transmitted from the multiple transmit antennas 201 propagate through a matrix channel 208 and are received by multiple receive antennas 202. The signals received on the multiple receive antennas 102 are multiplied by receive weights 206 using multipliers 203 and summed by a summation device 209 to produce the output symbol stream 207. The index "k" in FIG. 2 on the signals and on the transmit and receive weights denotes a time index, or a subcarrier (frequency) index (as in the case of OFDM for example), or a combination of both.

Figure 3:
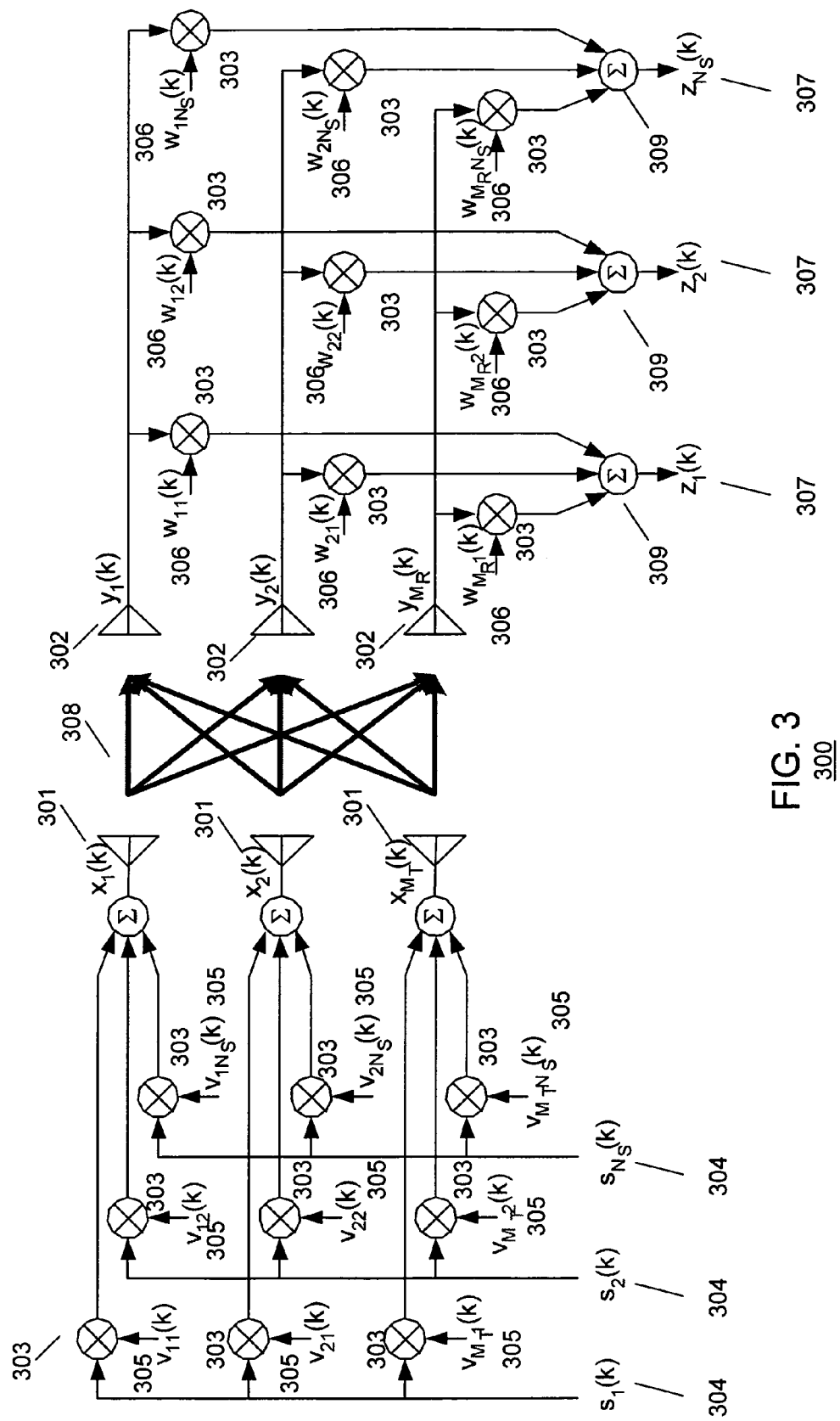
FIG. 3 is a block diagram of a closed-loop transmit antenna array communicating multiple data streams to a receiving device having one or more receive antennas.

FIG. 3 is a block diagram of a closed-loop transmit antenna array as part of a source unit communicating multiple data streams to a receiving device as part of a target communication unit having one or more receive antennas (e.g., a MIMO system). Multiple input streams 304 are multiplied by transmit weights 305 using multipliers 303 before being fed to the multiple transmit antennas 301. The signals transmitted from the multiple transmit antennas 301 propagate through a matrix channel 308 and are received by multiple receive antennas 302. The signals received on the multiple receive antennas 302 can be multiplied by receive weights 306 using multipliers 303 and summed by a summation devices 309 to produce the multiple output symbol streams 307. Other embodiments of producing the output symbol streams 307 are possible such as maximum likelihood detection or successive cancellation that may or may not use the receive weights 306 and the multipliers 303.

Figure 4:
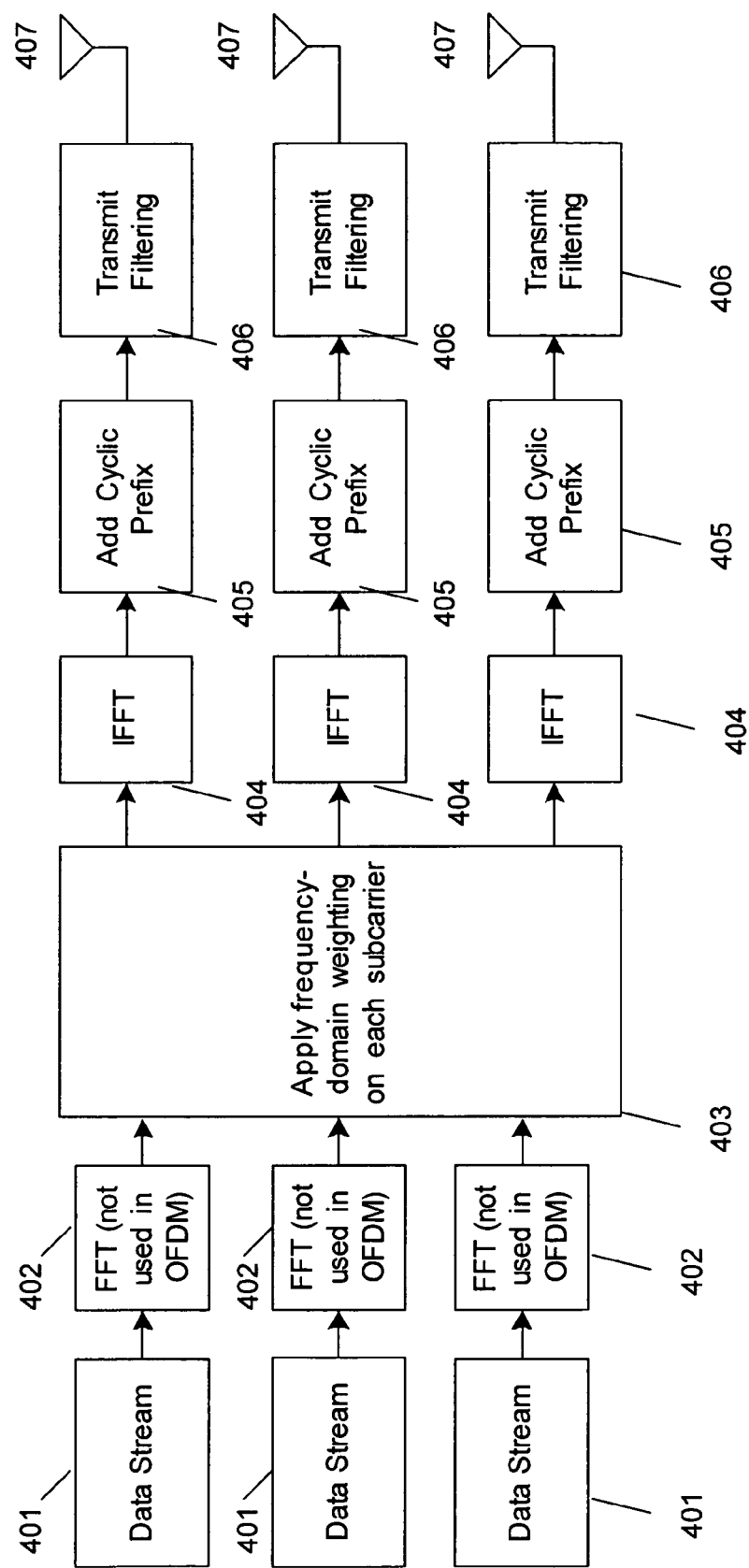
FIG. 4 is a block diagram of a frequency domain-oriented broadband transmission system employing a closed-loop transmit antenna array.

FIG. 4 is a block diagram of a frequency-domain oriented transmission system such as Orthogonal Frequency Division Multiplexing (OFDM) or Cyclic Prefix Single Carrier (CP-Single Carrier) in which the transmission techniques of FIG. 2 and FIG. 3 are performed in the frequency domain prior to transmission. In a CP-Single Carrier system, one or more data streams 401 are first brought into the frequency domain with one or more FFTs 402 and the frequency domain data streams are weighted with frequency domain weighting apparatus 403. In OFDM, the one or more data streams 401 are sent directly to frequency domain weighting apparatus 403 without the use of FFT 402. The frequency domain weighting apparatus 403 implements the weighting function shown in the transmit portion of FIG. 2 and FIG. 3 on each subcarrier or frequency bin in the frequency domain. Thus, the transmit signal can be tailored either spatially, or in frequency, or both with this type of a system. The outputs of the frequency domain weighting apparatus 403 are then brought back into the time domain with IFFTs 404. Cyclic prefixes are added 405 as is known in the art. Transmit filtering 406 is then performed before sending the transmitted signals to the transmit antennas 407.

In mathematical terms, one aspect of the invention is a method and device for efficiently providing, to the BS, one or more transmit weight vectors that are used to multiply one or more data streams, as shown in the block diagrams of FIG. 2., FIG. 3., and FIG. 4. The transmit weights can be calculated as follows. In limited feedback MIMO transmission, a codebook is maintained (or computed) at both the BS (transmitting device) and the SS (receiving device), and this codebook contains all possible transmit weight vectors that will be used by the transmit antenna array at the BS. The SS determines which transmit weight vector is the best weight vector in the codebook to use for data transmissions. The SS performs this determination based on BS transmissions such as pilot received on the downlink. The SS also computes a power weighting that should be applied on each data stream so as to optimize the performance of the particular receiver type implemented. The transmit weights are thus the codebook weight times the square-root of the power weighting for the particular transmit weight.

Figure 5:
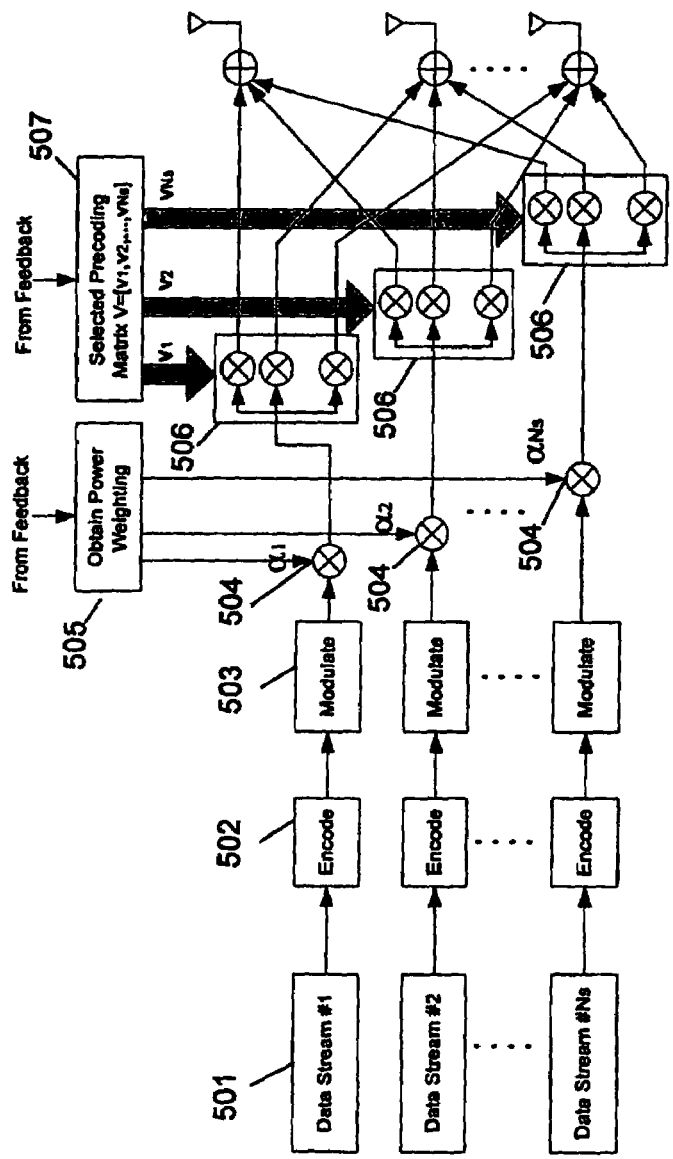
FIG. 5 is a block diagram of a transmitter using codebook selection and power weightings.

FIG. 5 is a block diagram of a source unit using codebook selection and power weightings. One or more data streams 501 are individually encoded (502) and modulated (503) to form the symbol streams to be transmitted, using either the frequency or time domain resources. Each stream is then power weighted in 504, according to the scalar weighting derived in block 505 from the feedback message. Then, each stream is weighted in block 506 by a beamforming vector. The beamforming vector for each stream is obtained in block 507 by selecting from the codebook according to the feedback message that conveys the index of the selected transmit weight vector. The transmitted signal is then generated from all streams after power weighting and beamforming.

Figure 6:
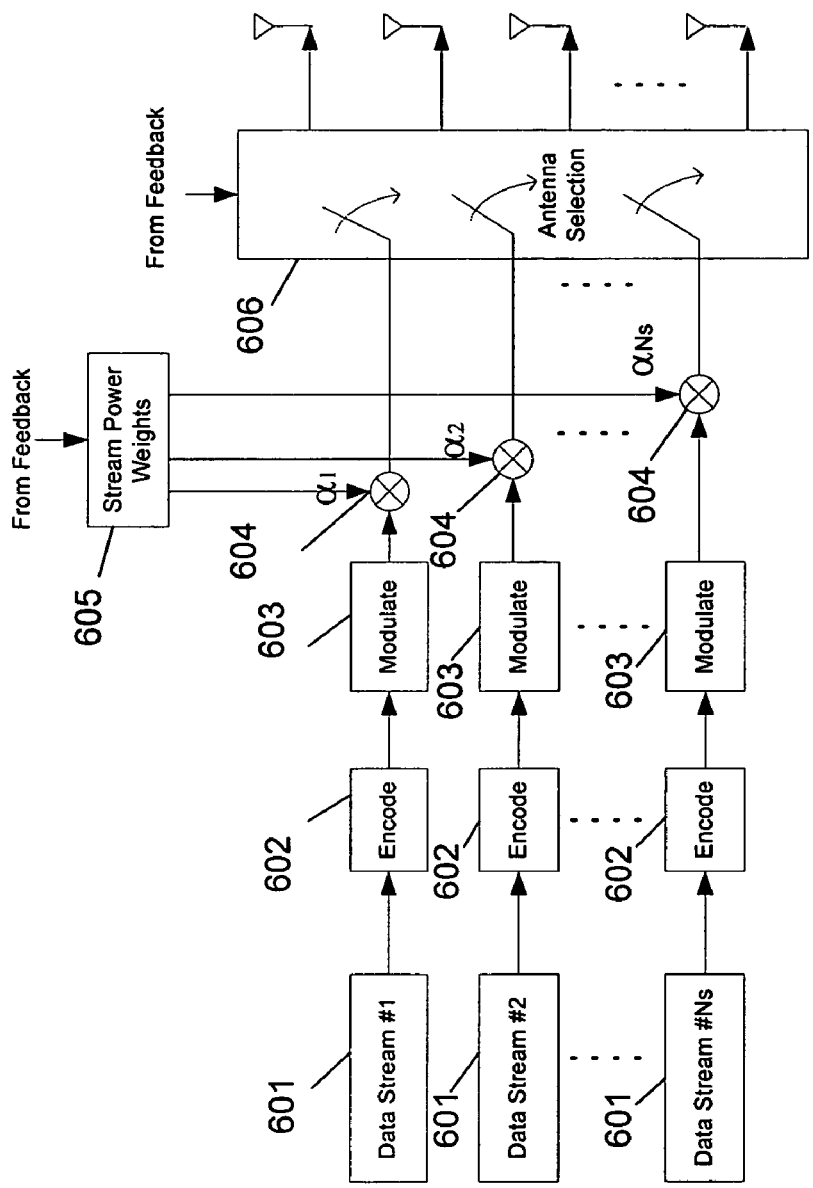
FIG. 6 is a block diagram of a transmitter using antenna selection and power weightings.

FIG. 6 is a block diagram of a source unit using antenna selection and power weightings. Note that this case is mathematically equivalent to using the codebook selection strategy of FIG. 5. with a codebook whose columns correspond to the columns of the identity matrix. One or more data streams 601 are individually encoded (602) and modulated (603) to form the symbol streams to be transmitted, using either the frequency or time domain resources. Each stream is then power weighted in 604, according to the scalar weighting derived in block 605 from the feedback message. Then, each stream is fed to an antenna through the antenna selection switch block 606. The antenna selection for each stream is according to the feedback message that conveys the index of the selected antenna for that stream. The antenna selection switch block 606 picks a subset of the total number of transmit antennas on which to transmit the data streams.

Figure 7:
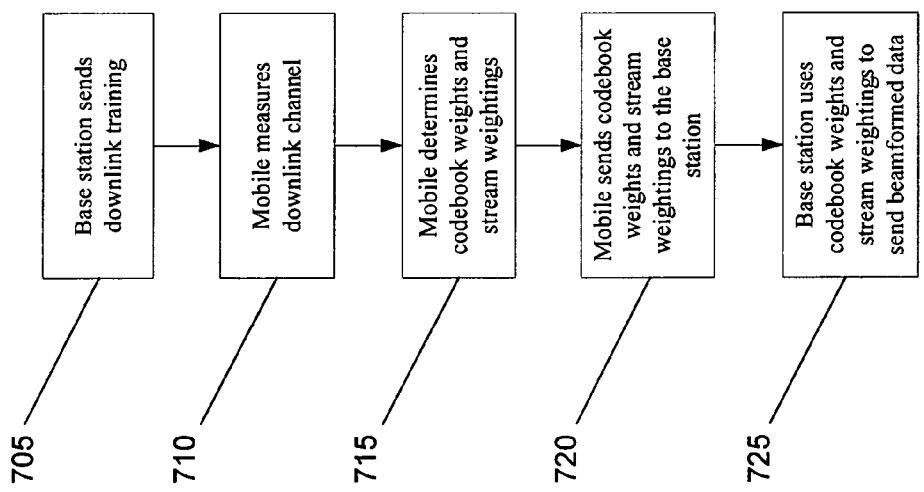
FIG. 7 is a flow chart of the entire feedback process.

FIG. 7 is a flowchart representation of the entire feedback method used by the invention. First, the BS transmits pilot data (i.e., symbols known at both the BS and MS) from each of its transmit antennas on a downlink 705. Next, the MS receives the downlink pilot data and measures the downlink channel estimates from each of the BS's antennas to each of its receive antennas 710 (although the pilots are preferably transmitted by the BS and used by the MS for said channel estimation, alternative channel estimation techniques, such as blind or decision-directed channel estimation methods may sometimes be used in the absence of pilots or as a supplement to the pilot-based channel estimation). Then the MS uses the downlink channel estimates to determine which of the codebook weight that the BS should use and the power weighting for each data stream 715. In one aspect of the invention, the selection of codebook weights and power weightings also includes a procedure to determine how many streams that the BS should transmit with. Then the MS encodes the codebook selections and power weightings in a feedback message and transmits the feedback to the BS 720. Finally, the BS receives the feedback and uses the information in the feedback message to beamform a downlink data transmission 725.

Figure 8:
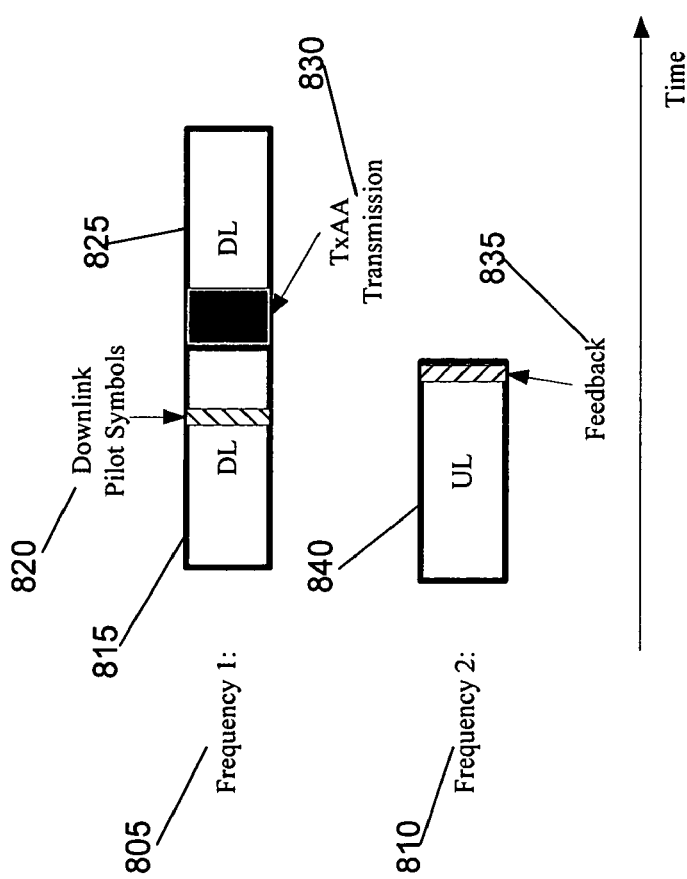
FIG. 8 is a timing diagram of the feedback process for FDD mode.

An example timing diagram of the feedback method is given in FIG. 8 for Frequency Division Duplexing (FDD) mode. For this FDD example the downlink is on carrier frequency 1 805 and the uplink is on carrier frequency 2 810. The BS sends pilot symbols from each of its transmit antennas 820 in a downlink frame 815. For example, in an OFDM system, the pilot symbols from different transmit antennas can be made orthogonal (to simplify the channel estimation at the MS) by time multiplexing, frequency multiplexing, code multiplexing, or some combination of these. An example of frequency multiplexing for the case of 4 transmit antennas is to transmit pilot symbols during a particular OFDM symbol period from antenna 1 on every $4^{th}$ subcarrier starting with the first subcarrier (subcarriers 1, 5, ... ), from antenna 2 on every $4^{th}$ subcarrier starting with the second subcarrier (subcarriers 2, 6, ... ), from antenna 3 on every $4^{th}$ subcarrier starting with the third subcarrier (3, 7, ... ) and from antenna 4 on every $4^{th}$ subcarrier starting with the fourth subcarrier (4, 8, ... ). Then the MS receives the pilot symbols and determines the codebook weight and power weighting for each data stream. The MS feeds back the codebook weights and power weightings in a feedback message 835 on an uplink frame 840. The base receives this feedback information and uses this information to perform closed-loop beamforming 830 on future downlink frame 825. Note that because the uplink and downlink transmissions occur simultaneously (unlike TDD mode), the overall delay from when the channels are measured 820 to when downlink beamforming is performed 830 can be small.

Figure 9:
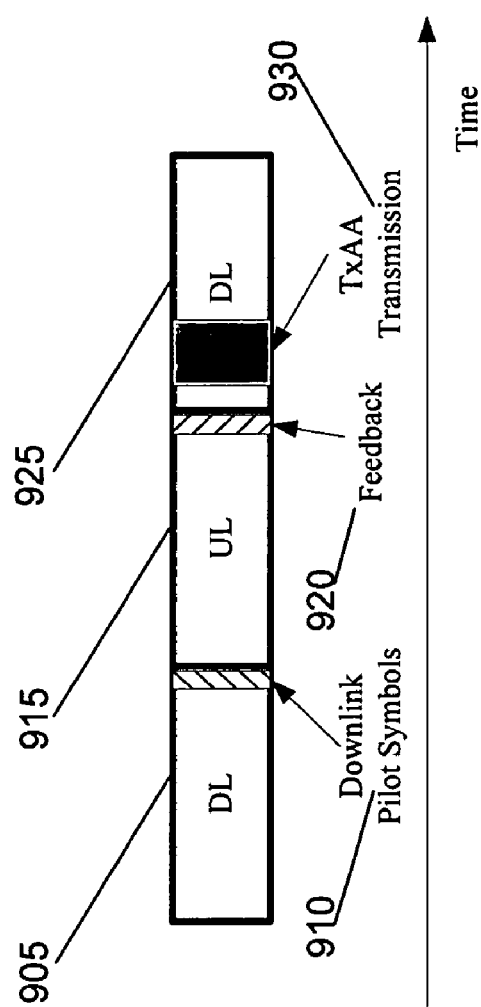
FIG. 9 is a timing diagram of the feedback process for TDD mode.

An example timing diagram of the feedback method is given in FIG. 9 for Time Division Duplexing (TDD) mode. The main difference between TDD and FDD modes is that in TDD the uplink and downlink can not be transmitted simultaneously and hence the uplink and downlinks must be separated in time. Because the uplinks and downlinks have to be separated in time, the feedback delay tends to be higher in TDD mode than FDD mode. However, the overall feedback operation is similar in both modes. The BS sends pilot symbols from each of its transmit antennas 910 in a downlink frame 905. Then the MS receives this data and determines the codebook weight and power weighting for each data stream. The MS feeds back the codebook weights and power weightings in a feedback message 920 on the next uplink frame 915. The base receives this feedback information and uses this information to perform closed-loop beamforming 930 on future downlink frame 925.

Figure 10:
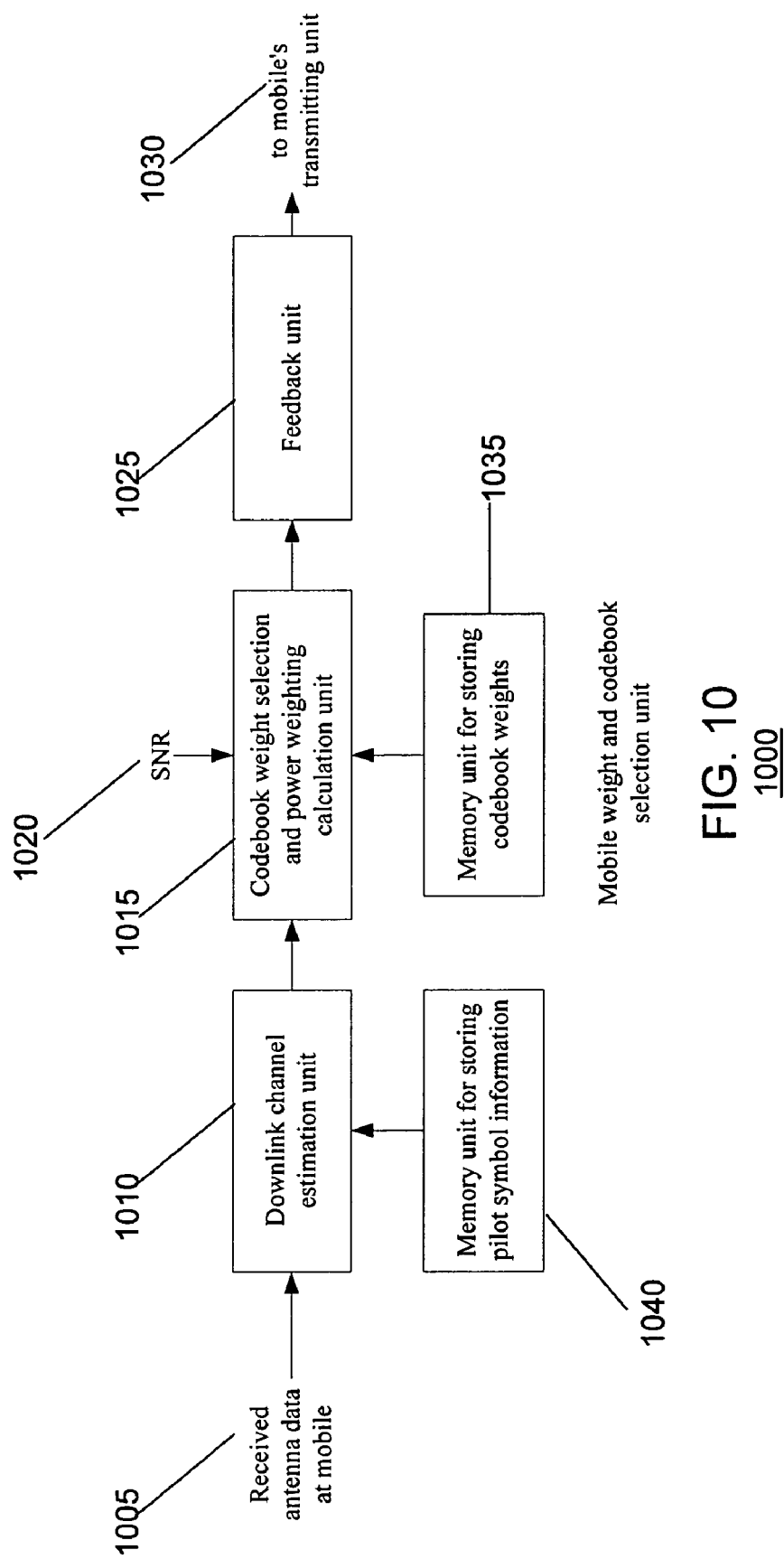
FIG. 10 is a block diagram of a mobile's weight and codebook selection unit.

FIG. 10 is a block diagram of the MS weight and codebook selection unit 1000. The downlink channel estimation unit 1010 is provided with received antenna data 1005 corresponding to the transmitted pilot data from the BS along with the pilot symbols for each BS transmit antenna from the memory unit for storing pilot symbol information 1040. The downlink channel estimation 1010 unit uses the provided information to determine channel estimates, which it provides to the codebook weight selection and power weighting calculation unit 1015. The codebook weight selection and power weighting calculation unit 1015 is also provided with an estimate of the Signal to Noise Ratio (SNR) 1020 as well as the codebook weight choices from the memory unit for storing codebook weights 1035. The codebook weight selection and power weighting calculation unit 1015 uses the provided information to determine which codebook weight to use on each stream along with their corresponding power weightings. The codebook weight selection and power weighting calculation unit 1015 may also determine the number of data streams along with the codebook weight selection and power weighting calculation. The codebook weight selection and power weighting calculation unit 1015 then provides the codebook weights and power weightings to the feedback unit 1025 which encodes this information for transmission to the base. The feedback unit 1025 provides the encoded feedback information to the MS's transmitting unit 1030 which transmits the information to the BS.

Figure 11:
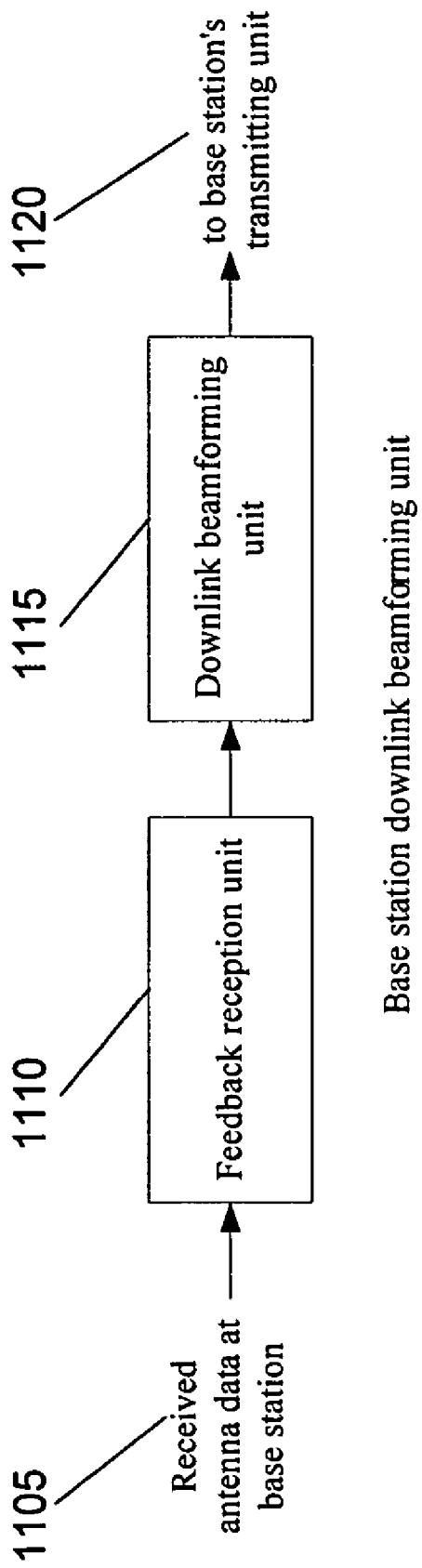
FIG. 11 is a block diagram of a base station's downlink beamforming unit.

FIG. 11 is a block diagram of the BS's downlink beamforming unit 1100. The feedback reception unit 1110 is provided with the received antenna data 1105 corresponding to the feedback portion of an uplink. The feedback reception unit 1110 uses the provided received feedback data to determine the codebook weight selection and power weightings sent by the MS in its feedback message. The feedback reception unit 1110 then provides the codebook weight selection and power weightings to the downlink beamforming unit 1115 which uses this information to produce beamformed downlink data to the MS. The beamformed downlink data is sent to the BS's transmitting unit 1120 for transmission on a downlink data frame.

Figure 12:
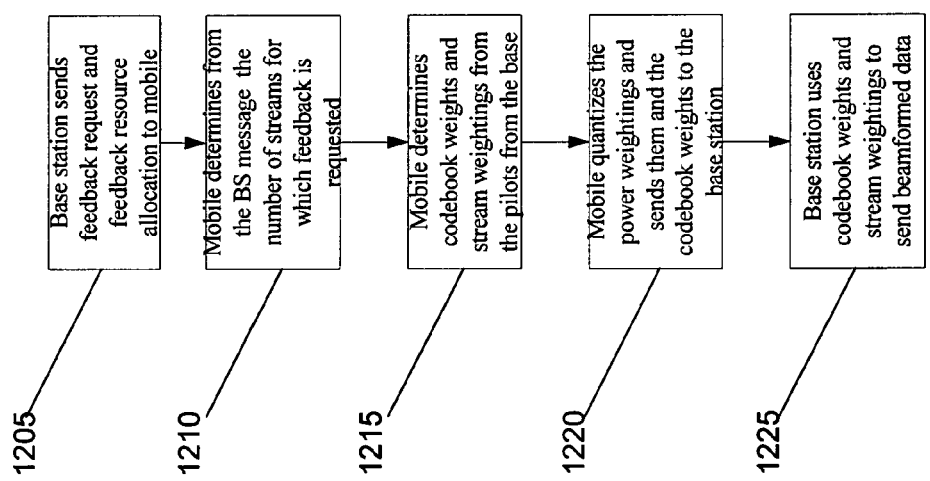
FIG. 12 is a flowchart of the preferred signaling and feedback method.

A preferred signaling and feedback method is described in the flowchart of FIG. 12. First, the base station sends a feedback request and a feedback resource allocation to the mobile 1205. Next, the MS determines the number of streams for which feedback is requested from the BS message 1210. The number of data streams is implicitly determined based on the number of feedback resources assigned by the transmitter (BS). Then, the mobile determines codebook weights and stream weightings from the pilot sent from the BS 1215 (although the pilots are preferably transmitted by the BS and used by the MS for said channel estimation, alternative channel estimation techniques, such as blind or decision-directed channel estimation methods may sometimes be used in the absence of pilots or as a supplement to the pilot-based channel estimation). The codebook selection process may use the method that uses the combination of maximum receive power and maximum capacity criteria (described later). Then, the MS quantizes the power weightings and sends them and the codebook weights to the base station 1220. The quantization method may use the approach that sequentially quantizes the power of the data streams in a range that depends on the power of the previously quantized stream power (described later). Finally, the base station uses the codebook weights and restored stream weightings to send beamformed data 1225.

For the feedback method described in the previous paragraphs, the channel bandwidth may be divided into different granularities and the feedback and transmit weighting can be performed accordingly. For example, a single set of codebook weights and power weights can be fed back and used for the entire bandwidth allocated to a particular MIMO transmission to a MS (e.g., all OFDM subcarriers that will be used for the transmission). Alternatively, a frequency selective approach can be used, where more than one set is fed back, with each set corresponding to a different set of subcarriers. This latter approach increases the feedback overhead but may provide improved performance in some frequency selective channel conditions. In another example, a single set of codebook weights and power weights can be determined based on the channel estimates over a bandwidth that is larger than the bandwidth that will be used for the subsequent MIMO transmission (e.g., based on the entire channel bandwidth even though the subsequent MIMO transmission to the MS will only occupy a small subset of the total subcarriers). This latter approach provides more averaging and may be beneficial when the channel is expected to change significantly between the time when the pilots are transmitted and when the MIMO transmission will occur.

A detailed description of the proposed feedback method is now given. Let there be $M_b$ transmit antennas at the base and $M_m$ receive antennas at the mobile: Assuming an OFDM downlink with K usable subcarriers, the received $M_m \times 1$ signal at the mobile on subcarrier k ($0 \leq k \leq K-1$) and symbol time b is given as (note this is the downlink signal used by the mobile to measure the channel response to each base antenna):

$$Y(k,b) = H(k,b) x(k,b) + N(k,b) \tag{1}$$

where $H(k,b)$ is the $M_m \times M_b$ frequency-domain channel matrix on subcarrier k and symbol time b, $x(k,b)$ is the $M_b \times 1$ training vector, and $N(k,b)$ is additive noise with covariance matrix $\sigma_n^2 I_{M_m}$ (where $I_n$ is an n×n identity matrix). Time index b indicates the time where the downlink channel is measured for use in determining the power weights and codebook weights to feed back (multiple time indices can be used if multiple OFDM symbols are needed to sound all $M_b$ transmit antennas).

Codebook Index Selection

It will be assumed that there are NC codebook weights given in the $M_b \times N_c$ matrix V. Particular examples of V are the Grassmannian weights from the prior art or the antenna selection weights (i.e., $N_c = M_b$ and $V = I_{M_b}$). The $M_m \times N_c$ composite frequency-domain channel for all codebook weights (i.e., the RF channel matrix times all codebook weights) is given as:

$$G(k,b) = H(k,b) V \tag{2}$$

where the mobile uses its estimate of $H(k,b)$ measured on the downlink.

Now the mobile just needs to determine which of the $N_s$ (where $N_s$ is the number of MIMO streams) columns of V to use as the codebook weights for each stream. Various criteria can be used to determine the weights such as choosing the $N_s$ columns of $G(k,b)$ (averaged across frequency) that have the highest power or choosing the $N_s$ columns of $G(k,b)$ that maximize the average capacity. For the maximum power selection technique, the $N_s$ columns (labeled $v_1$ through $v_{N_s}$) are chosen as the v's corresponding to the $N_s$ largest values of:

$$\sum_{k \in \Omega} g_v^H(k,b) g_v(k,b) \tag{3}$$

where $\Omega$ is the set of subcarriers for the single set of codebook weights and $g_v(k,b)$ is the $v^{th}$ column of $G(k,b)$. As described earlier, different frequency granularities may be used in different scenarios, and this is reflected in the choice of $\Omega$.

The maximum capacity method is given as the $N_s$ columns (labeled $v_1$ through $v_{N_s}$) chosen as the v's corresponding to the $N_s$ largest values of:

$$\sum_{k \in \Omega} \log_2 \left( 1 + \frac{1}{N_s \sigma_n^2} \det \left( \begin{bmatrix} g_{v_1}^H(k,b) \\ \vdots \\ g_{v_{N_s}}^H(k,b) \end{bmatrix} [ g_{v_1}(k,b) \; \ldots \; g_{v_{N_s}}(k,b) ] \right) \right) \tag{4}$$

where the search over is performed over all $\binom{N_c}{N_s}$ possible combinations of $v_1$ through $v_{N_s}$, where $\binom{N_c}{N_s}$ is the conventional notation used to denote the number of the combinations when taking $N_s$ from $N_c$ elements at a time.

One aspect of the invention is a means of combining the maximum power codebook selection technique with the maximum capacity. The method is designed to reduce the number of combinations that capacity computation of (4) has to be performed. For example, one codebook weight can be selected from the weight that provides the largest value in (3). Then the remaining weights are selected from (4) by searching over all $\binom{N_c-1}{N_s-1}$ remaining combinations of $v_2$ through $v_{N_s}$. In general, up to $N_s-1$ weights can be chosen as the up to $N_s-1$ codebook weights with the highest values in (3). Thus the search over the capacity in (4) can be made fairly trivial.

Stream Power Calculation

The power levels on each stream can be calculated in a manner that provides the best expected performance given the receiver type implemented at the receiver.

Efficient Signaling of the Feedback

The following feedback signaling mechanism is described assuming that the power is to be fed back to the BS. However, the algorithm can be easily extended to feeding back other quantities such as the voltage (which is the square-root of the power).

Efficient Quantization of Power Weightings and Codebook Weights

Any quantization strategy can be used to signal the codebook weights, but for simplicity it will be assumed that the codebook weight for each data stream is quantized to B bits.

For the quantization of power weightings for all streams, a simple-minded approach is to quantize each stream using the same number of bits. However, a more efficient quantization method is described here after recognizing the fact that the range of each stream can be refined to a smaller region. The method sequentially quantizes the power weightings of the data streams in a numerical range that depends on the power weighting of the previously quantized stream powers. Also noted here that the streams are indexed in the order of decreasing power weighting and all power weightings sum up to one. So the number of bits assigned to quantize each stream can be smaller due to the decreasing range.

The quantization scheme is given as:
1. Determine the codebook weight and power weighting for each of the $N_s$ data streams.
2. Quantize the codebook weights for each stream to B bits.
3. Quantize the power weighting of the first data stream to one of $L_1$ levels between $1/N_s$ and $P_{ul}$ ($P_{ul}$ is a predetermined upper limit on the power, e.g., $P_{ul}=1$). For example, $B_1$ bits can used to signal the $L_1$ levels (i.e., $L_1=2^{B_1}$). Let $P_1$ denote the quantized power level for stream one.
4. For the m-th stream where $m=2$ to $N_s-1$, quantize the power weighting of the m-th data stream to one of $L_m$ levels between $$\frac{1}{N_s+1-m}\left(1-\sum_{n=1}^{m-1}P_n\right)$$

and the smaller value between the quantized $P_{m-1}$ and $$1-\sum_{n=1}^{m-1}P_n.$$

For example, $B_m$ bits can used to signal the $L_m$ levels (i.e., $L_m=2^{B_m}$) and $B_m<=B_{m-1}$. For each of the m data streams, let $P_m$ denote the quantized power for stream m.

Thus the total amount of feedback (in number of bits) needed for the power weight is $$\sum_{m=1}^{N_s-1}B_m.$$

Note that the quantization method quantizes the power for streams one through $N_s-1$ and the power for last stream ($N_s$-th) is determined from the power of the other streams. However, the power can be quantized for any arbitrary group of $N_s-1$ data streams and the remaining stream can be determined from the power of the other streams. Note also that the algorithm assumes the sum of all stream powers is one. However, the algorithm is easily extended to the case where the sum of all stream powers is an arbitrary value.

Implicit Signaling of the Number of Streams

Note that for the power weight quantization that the number of streams, $N_s$, is already determined. Ideally, the MS should determine $N_s$ and convey this information to the BS along with the power weightings and the codebook weights, since the optimal number of streams is dependent on the channel condition learned at the MS (e.g., spatial condition and the receive SNR). However, the feedback resource is often pre-allocated by the BS. Although a maximum feedback resource can always be allocated, it can be wasteful. On the other hand, the receiver can feedback the number of data streams first as a request for feedback resource, but it can involve extra latency. Therefore, it may be desirable for the BS to determine $N_s$ and then the BS convey $N_s$ to the MS. Another aspect of the invention is the implicit determination of $N_s$ by the MS from the feedback resources assigned by the BS. A simple example of this is that the BS request the MS to transmit feedback on $N_s$ (or $N_s+1$) feedback resource blocks. Thus the number of feedback resource blocks assigned by the BS indicates $N_s$. Although the MS may lose the flexibility to control the number of streams now, the whole system can still benefit from such an efficient mechanism that allows the BS to implicitly signal to the MS about the number of streams for which power weightings and codebook weights should be fed back. For example, the default number of streams can set to 1 initially for all MS's and then the feedback allocation is increased to allow more streams if the BS finds it necessary and beneficial. Note that the signal stream is optimal for many cases anyway, such as, but not limited to, the case when the MS is only equipped with a single antenna, when the receive SNR is low enough to support a single stream, when the optimality of multiple streams can not be guaranteed because the beamforming weights quickly become obsolete due to rapid channel variation, or when the BS decides to do single-stream SDMA to many users rather than multi-stream to one user.

The preferred signaling and feedback method is described in the flow chart of FIG. 12. First, the base station sends a feedback request and a feedback resource allocation to the mobile 1205. Next, the MS determines the number of streams for which feedback is requested from the BS message 1210. The number of data streams is implicitly determined based on the number of feedback resources assigned by the transmitter. Then, the mobile determines codebook weights and stream weightings from the pilot sent from the base 1215 (although the pilots are preferably transmitted by the BS and used by the MS for said channel estimation, alternative channel estimation techniques, such as blind or decision-directed channel estimation methods may sometimes be used in the absence of pilots or as a supplement to the pilot-based channel estimation). The codebook selection process may use the method that uses the combination of maximum receive power and maximum capacity criteria (described earlier). Then, the MS quantizes the power weightings and sends them and the codebook weights to the base station 1220. The quantization method may use the approach that sequentially quantizes the power of the data streams in a range that depends on the power of the previously quantized stream power (described earlier). Finally, the base station uses the codebook weights and restored stream weightings to send beamformed data 1225.

A specific example of the power quantization and implicit signaling of $N_s$ is now given for illustrative purposes. The feedback resource block of 6 bits is assumed in the following and the resource block is referred to as a fast feedback channel in IEEE 802.16 standard.

1. The BS requests the MS to transmit on four six-bit feedback channels (for a total of 24 bits of feedback).
2. The mobile knows $N_s$=4 because of the amount of feedback requested by the BS (i.e., that there is one stream for each feedback channel requested).
3. The MS determines which four codebook weights that the BS should transmit with.
4. The MS quantizes the codebook weights on each stream to B=4 bits (thus $N_s$*B=16 bits out of the 24 total are used to convey the codebook weight).
5. The MS quantizes the square-root of the power weighting of each data stream from the above algorithm (where the range of each stream is the square-root of what is shown above to accommodate the quantization of the voltage instead of power) using $B_1$=4 bits, $B_2$=2 bits, and $B_3$=2 bits.
6. The MS transmits the 24 bits of feedback to the base.
7. The BS transmits using the four codebook weights and their respective power levels specified in the feedback channels.

The feedback method of the invention can be expanded to include the following capabilities:

1. Jointly calculating optimal codebook plus power weightings instead of separately calculating both as described above.
2. Calculating the power weights and determining the codebook using more subcarriers than in the set Ω for improving performance in mobility. Basically this idea provides more averaging to determine the solution and thus is better matched to the long-term statistics of the channel.

In summary, the invention can be summarized as follows: The invention comprises a method for communicating a plurality of data streams between a transmitting device with multiple transmit antennas and a receiving device. The method comprises encoding the power weightings for efficient feedback to the transmitter. The method also comprises an efficient method of determining the $N_s$ codebook weights that maximize the theoretical capacity. Additionally the method comprises a method of implicitly signaling the number of data streams that the transmitter wants the receiver to feedback data for.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. It is intended that such modifications, alterations, and combinations come within the scope of the following claims.

We claim:

1. A method comprising the steps of:
receiving a plurality of bits representing power weightings information, wherein information representing a first power weighting is represented by a first number of bits, and information representing a second power weighting is represented by a second number of bits, wherein the first number of bits is larger than the second number of bits;
determining the first power weighting value for a first data stream from the first number of bits, wherein the first power weighting value can take on values within a first range;
determining the second power weighting value for a second stream from the second number of bits, wherein the second power weighting value can take on values within a second range, wherein the second range is based on the first power weighting value; and
transmitting data streams weighted by the power weighting values.

2. The method of claim 1 further comprising the step of:
transmitting information regarding the first and the second power weightings.

3. The method of claim 2 wherein the step of transmitting information regarding the first and the second power weightings comprises the step of transmitting the power weightings from a largest value to a smallest value.

4. The method of claim 2 wherein the step of transmitting information regarding the first and the second power weightings comprises the step of transmitting a square root of the first and the second power weightings.

5. The method of claim 1 further comprising the step of:
receiving data streams weighted by the first and the second power weighting values.

6. An apparatus comprising:
a receiver receiving a plurality of bits representing power weighting values, wherein a first power weighting value is represented by a first number of bits, and a second power weighting value is represented by a second number of bits, wherein the first number of bits is larger than the second number of bits; and wherein the first power weighting value can take on values within a first range and the second power weighting value can take on values within a second range, wherein the second range is based on the first power weighting value; and
a transmitter transmitting data streams weighted by the power weighting values.

7. The apparatus of claim 6 further comprising the step of:
a receiver receiving data streams weighted by the power weighting values.

8. The apparatus of claim 6 further comprising the step of:
transmitting information regarding the of power weighting values.

9. The apparatus of claim 8 wherein the information regarding the power weighting values is transmitted from a largest value to a smallest value.

10. The apparatus of claim 8 wherein the information regarding the power weighting values comprises a square root of the power weighting values.

11. The apparatus of claim 8 wherein the information regarding the plurality of power weighting values is transmitted from a largest value to a smallest value.

* * * * *